Jan. 9, 1951   R. D. HICKOK   2,537,221
METER WITH ADJUSTABLE MAGNETIC STRUCTURE
Filed Feb. 15, 1947   2 Sheets-Sheet 1

INVENTOR
ROBERT D. HICKOK
BY
Hyde, Meyer, Baldwin & Doran
ATTORNEYS

Jan. 9, 1951 R. D. HICKOK 2,537,221
METER WITH ADJUSTABLE MAGNETIC STRUCTURE
Filed Feb. 15, 1947 2 Sheets-Sheet 2

INVENTOR
ROBERT D. HICKOK
BY Hyde, Meyer, Baldwin & Doran
ATTORNEYS

Patented Jan. 9, 1951

2,537,221

UNITED STATES PATENT OFFICE 2,537,221

METER WITH ADJUSTABLE MAGNETIC STRUCTURE

Robert D. Hickok, Bratenahl, Ohio, assignor to Cleveland Patents, Incorporated, Cleveland, Ohio, a corporation of Ohio Application February 15, 1947, Serial No. 728,913

4 Claims. (Cl. 171—95)

The invention relates to improvements in electrical indicating or measuring instruments of the D'Arsonval type. The advantages of the invention are particularly obvious in connection with meters wherein the suspended coil is swingable in an arc defined by the curvature of an annular core which the coil surrounds but does not touch.

As is familiar to those skilled in the art, a coil carrying a variable current, and suspended in an air gap in a magnetic field, tends to move or swing in a specific direction responsive to the strength and direction of the lines of magnetic force, or magnetic field concentration. The strength of the air gap field concentration varies inversely with the square of the air gap distance between opposed magnetic pole elements. To increase the magnetic field concentration it is customary to extend the magnetic poles by plates, projections, extensions or otherwise, so that they closely circumscribe the orbit of movement of the coil, thereby reducing the width of the inefficient air gap to a span sufficient merely to permit unobstructed swing of the D'Arsonval coil. It is obvious however that irregularities in coil movement arise from unavoidable variations in fabricating and assembling meter parts, since such variations, dimensional and otherwise, cause consequent variations in the concentration of the magnetic force lines throughout the air gap in the path of the coil swing. As a result, if a pointer responsive to coil movement swings across a standard scale graduated in uniform increments, reading errors must be anticipated by reason of the above noted variations in the field strength uniformity of the air gap. Additional scale errors arise from non-uniform hair spring torque, from the uneven magnetic permeability of the core and pole piece members, and from the uneven magnetic pattern of the metallic magnet member, pole pieces, or core pieces.

It is further known to those skilled in the art that D'Arsonval meters may be made in two general types. In the first type the coil is suspended and positioned to swing symmetrically on a fixed axis, around a cylindrical or block type of core. This is termed the "ninety degree" type, since the core must be held by some kind of support which permits the coil to swing to an angular extent not much in excess of ninety degrees. In the second type the coil is fixed symmetrically with respect to the axis of rotation, so that the coil may swing around an annular or horseshoe like core, achieving an angular revolution of more than two hundred and fifty degrees. This second type is conventionally termed the "two hundred and fifty degree type" but will be herein termed, for convenience, the full swing type.

The ninety degree type of meter often has a fairly low percentage of scale deviation, or scale error, particularly when the error arises from core displacement, since an increase in the air gap on one side of the core produces a decrease on the other side, and since the coil spans the core the two magnetic concentration errors offset each other. In meters of the full swing type air gap variations are not compensated within the span of the coil, and consequently with this design of meter the scale deviation may amount to a harmful percentage.

While the novel improvements herein to be disclosed are applicable to any meter or electrical instrument in which a current-carrying coil moves in an air gap in a magnetic field responsive to variations in a current in the coil, the advantages of the invention are particularly apparent in the compensation of scale variations in a full swing meter.

An object of the invention, therefore, is to provide simple but efficacious means for compensating for errors arising from magnetic field strength variations in the air gap path of swing of a D'Arsonval coil.

A further object of the invention is to provide a meter structure including opposed magnet poles, a D'Arsonval coil rotatable between the poles, and cooperating pole and core plates, and a peripheral flux-conducting wall surrounding the coil and carried by one of the magnet poles, said wall having portions adjustably movable towards and away from the coil so as to vary the magnetic flux intensity effective upon the coil.

A further object of the invention is to provide positionally variable means of the character indicated in the last preceding paragraph, the means being adjustable to compensate for air gap variations, dimensional errors, or other causes, so that an indicating pointer carried by the coil, or responsive to movement thereof, will accurately "track" over a standard uniform indicating scale.

A further object of the invention is to provide means of the character indicated in the last preceding paragraph whereby assembly of the operating elements of a full swing meter is greatly facilitated.

Other objects and advantages will be apparent from a study of the following specification, in conjunction with the accompanying drawings in which:

Fig. 1 is a top plan view of the operating parts of a D'Arsonval meter of the full swing type, the scale plate, cover plate, and top pole plate being partially broken away to reveal structure therebelow;

Figs. 2 and 3 are sectional views taken respectively on the lines 2—2 and 3—3 of Fig. 1;

One embodiment of a D'Arsonval meter embodying my invention is shown in Figs. 1 to 6 inclusive.

The invention comprises a source of magnetic field energy consisting, in this instance, of a pair of cooperating permanent magnets 10a and 10b. The magnets may of course be energized electrically, if convenient or desirable, although permanent magnets, or a single magnet of the bar type, are usually chosen for a portable meter of the photoelectric type.

Figure 1:
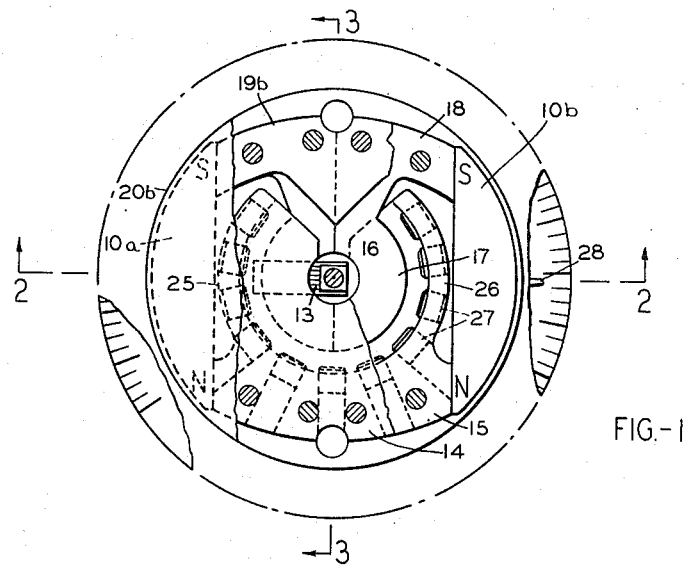

The complementary north and south poles of the magnets are indicated, in Fig. 1, by the capital letters "N" and "S" marked thereon. The magnets are maintained in spaced relationship to set up a field of magnetic force in which a coil 13 is freely movable, the movement being of the full swing type. To closely concentrate and intensify the air gap magnetic field strength, the north pole portions of the magnets are maintained in metallic continuity by bridging extensions in the form of a top pole plate 14 and a bottom pole plate 15, both pole plates being of magnetically conducting material. The south poles of the magnets are similarly maintained in metallic continuity by a core plate 16, likewise of magnetically conducting material. While one pole plate 15, and the core plate 16 are each shown as being assembled from two distinct parts, this is merely for convenience in assembly, and the respective parts are in operative contact and function as units.

The general use of pole plates, core plates, or like inward extensions of magnet poles, is known in the art, the novel aspects thereof being specifically disclosed hereinafter. In meters of the present type as previously constructed, the lines of magnetic force extended inwardly from spaced plates in contact with one magnetic pole to an interposed core or core plate in contact with the other magnetic pole. The outer edge periphery of the "sandwich," was not closed, except to the limited extent that the magnets or magnet poles usually occupied two diametrically opposed segmental portions of the total peripheral space. In the present instance my invention comprises the provision of wall means, consisting conveniently of annular segments, bridging the formerly open edge space between the outer pole plates, and thereby peripherally shielding the air gap in which the coil swings. My invention further comprises the provision of radially movable and adjustable flux-conducting elements carried by said wall means for varying the radial depth of the air gap in the path of movement of the coil so as to adjustably vary the magnetic field strength until the coil pointer corresponds to the uniformly marked scale divisions of a standard scale.

Core plate 16, considered as a functional unit although actually split as aforesaid, has an annular head 17 supported from and integral with a base 18. At opposed ends the base 18 is in magnetically conducting contact with the opposed south poles of magnets 10a and 10b. Core plate 16 is sandwiched between a pair of shims or spacers 19a and 19b, which in turn are fixed between upper and lower cover plates 20a and 20b, the cover plates being formed from non-magnetic material so as not to "short circuit" the air gap.

The pole plates 14 and 15 are in magnetic flux communication with the north pole portions of magnets 10a and 10b, said pole plates being spaced above and below core plate 16, but out of contact therewith so as to provide an air gap surrounding the core plate and affording a path of travel for coil 13.

Figure 2:
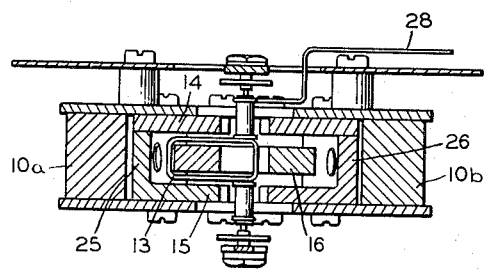
Figure 3:
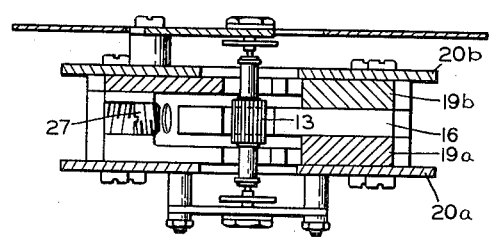
Figure 4:
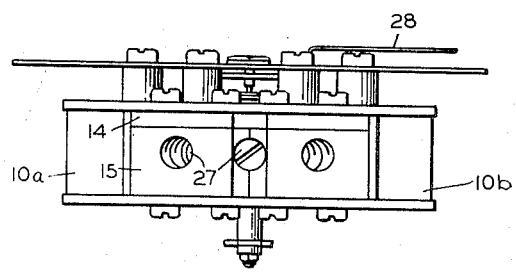
Fig. 4 is a side elevational view as seen from a position below Fig. 1.
Figure 5:
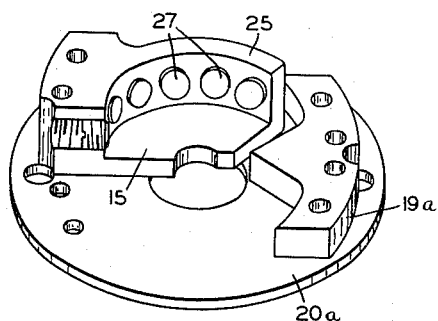
Fig. 5 is a perspective view showing a partial assembly of meter parts including a bottom plate, one-half of a pole plate, and a core-supporting shim.
Figure 6:
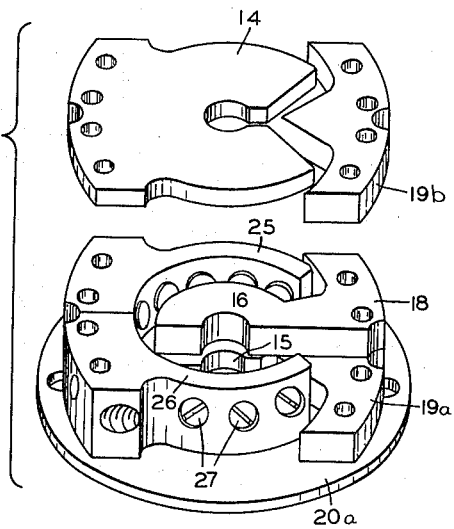
Fig. 6 is a view similar to Fig. 5 but showing additional meter parts including both halves of a pole plate resting on the bottom plate, and one-half of a core plate resting on the core supporting shim, a top pole plate and top shim being raised somewhat to reveal the internal arrangement.

Referring particularly to Figs. 2 and 6, lower pole plate 15 is provided with a pair of segmental wall portions 25 and 26 integral therewith, and spanning the vertical peripheral gap between pole plates 14 and 15. Since said pole plates are both in contact with like magnetic pole portions, it is immaterial whether walls 25 and 26 are integral with plate 14 or plate 15. It is sufficient that said walls are in flux conducting contact with both pole plates, and out of contact with the peripheral edge of the core plate.

The first useful and novel function of walls 25 and 26 is to magnetically shield and enclose the air gap in which one end of the coil swings, and to supply magnetically permeable metal for more homogeneous distribution of the source of magnetic flux lines.

The second useful and novel function of walls 25 and 26 lies in the provision of adjustable means for varying the air gap between the pole plates and the edge of the core plate. In the present instance this adjustable means comprises a peripherally spaced series of advanceable or retractable plugs or screws 27, the outer ends of which are slotted to permit manipulation thereof by a screwdriver. These movable members are carried in suitable apertures in walls 25 and 26, and are formed from magnetically conducting material which may conveniently be the same metal or alloy as that of the pole plates, or at least generally similar in magnetic characteristics. Their number may vary although as the description proceeds it will be apparent that each screw represents a potentiality for accurate adjustment at that point. If the meter scale is intended to have, for example, ten marked scale divisions, there may conveniently be ten adjusting screws.

The meter parts hereinabove disclosed and illustrated in the drawings are first assembled into an operating unit, it being understood that certain specific structural details of coil mounting and other features are not herein shown or described, since not necessary for an understanding of the present invention. Assembly is facilitated by the split core plate, and split pole plate. After assembly an electric current of known value, corresponding for example to a marked scale division, is passed through coil 13, whereupon the coil and pointer 28 swing to a position dependent on the current strength and the magnetic flux density across the air gap. Assuming that the pointer does not exactly conform to a scale marking representing the proper current value, the movable plug closest to the coil is advanced or withdrawn, thereby changing the local magnetic field density adjacent the coil, and producing a corresponding change in pointer position. If the adjusting screw happens to be in a wall portion behind a magnet, the magnet may be temporarily removed, a trial adjustment made and the magnet replaced for another scale test. For adjustment purposes the magnets usually have a sliding frictional fit in the general assembly.

The operator thus makes a scale test for each marked scale increment, each time adjusting the position of a screw 27 to cause the pointer to accurately indicate the proper scale marking, the series of tests involving the application to the coil of a respective series of increasing or decreasing current values so as to cover the full span of the meter dial. The complete operation of checking, and adjusting the air gap where necessary, requires only a few minutes by an operator of ordinary skill. Once properly adjusted, no change need be made during the life of the meter unless some essential part is replaced.

Prior to the development of my present invention, the most satisfactory attempt at a solution of the scale error problem was to devise an individual scale for each meter by the laborious process of placing a blank scale ring or disk beneath the pointer, applying a series of current values to the coil, and for each such application marking corresponding temporary indicia at the pointer position. The ring or disk was then removed and a permanent scale marked thereon corresponding to the temporary scale. Finally the scale was replaced on the same meter, and a final check made for permanent position. Under such procedure the scale increments are not necessarily equal, and the provision of properly marked subdivisions of such indicia is a troublesome problem.

While any diameter of adjusting screw, plug, or movable wall portion will produce an effect generally proportional to dimensional characteristics of such adjustable part, the most efficient construction involves making the screw diameter approximately as large as the width of the coil end wall adjacent thereto.

Figure 7:
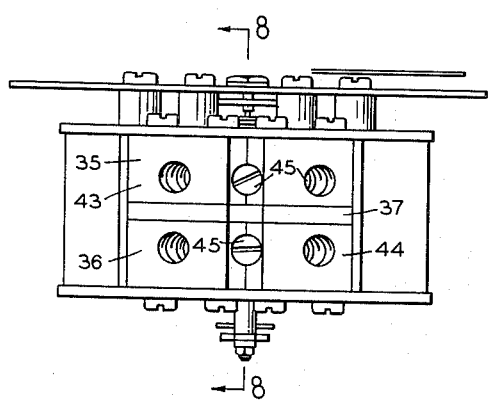
Fig. 7 is a side elevational view of a slightly modified embodiment of the invention.
Figure 8:
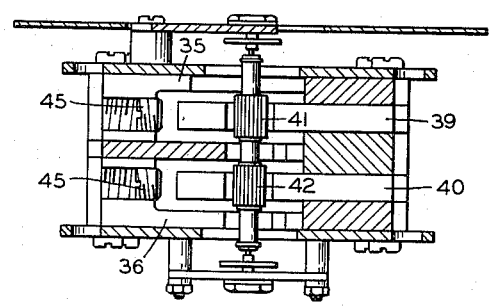
Fig. 8 is a vertical sectional view taken on the line 8—8 of Fig. 7.

Figs. 7 and 8 show my invention as applied to a so-called ratio meter such as is disclosed in my prior United States Patent No. 2,346,683, issued April 18, 1944. As apparent from the present drawings, the meter comprises an upper pole plate element 35, a lower pole plate element 36, and an intermediate pole plate element 37, all in contact with a magnet pole and corresponding to plates 14, 15 before described. It further comprises a pair of core plate elements, namely, an upper one 39 and a lower one 40, each in contact with the other magnet pole and corresponding to core plate 16 before described. For the present purpose it will be sufficient to state that in such meter the pointer deflection is proportional to the ratio of voltage to current, as a result of opposed torque developed in the opposed windings of the two coils, and the pointer swing therefore indicates resistance. As will be seen in Figs. 7 and 8 wall segments 43 and 44 are provided with spaced adjusting screws 45 of the nature and for the purpose hereinabove described.

It may be here mentioned that one set of pole pieces, for example pole pieces assembly 36, is so shaped that coil 42 moves in a field constantly increasing in flux density, while pole piece assembly 35 is designed to cause coil 41 to move in a field of constantly decreasing flux density. The same purpose may be achieved in other ways, as will be apparent to those familiar with the operation of a ratio meter.

What I claim is:

1. A meter of the character described comprising spaced magnet members of opposed polarities, a pole piece in magnetic flux-conducting contact with one said magnet member, a core in magnetic flux-conducting contact with the other said magnet member, said core and pole piece being spaced to provide an air gap, a current-carrying coil swingable in said air gap responsive to current variations in said coil, and magnetic flux-conducting wall means united with said pole piece and extending around a peripheral portion thereof adjacent the outer periphery of said core but spaced therefrom to at least partially surround said air gap, said wall means having independently movable portions adjustably movable towards and from the path of swing of said coil, to thereby adjustably vary the magnetic field concentration in said air gap.

2. A meter of the character described comprising magnet means having spaced pole portions of opposed polarities, a pair of spaced pole plates in magnetic flux communicating contact with magnet pole portions of one said polarity, a core in magnetic flux communicating contact with magnet pole portions of the other said polarity, said core being interposed between said pole plates, and spaced therefrom to provide an air gap, a current-carrying coil swingable in said air gap around said core responsive to variations in current in said coil, and magnetic flux-conducting wall means occupying a peripheral portion of the space between adjacent edge portions of said pole plates, and in contact therewith, and spaced from the outer periphery of said core, to magnetically shield said air gap, said wall means having independently movable portions adjustably movable towards and from said core adjacent the path of swing of said coil, to thereby adjustably vary the magnetic field concentration in said air gap.

3. A meter of the character described comprising a pair of spaced magnets, each having opposed north and south poles, a pair of spaced pole plates in magnetic flux communicating contact with like polar portions of both magnets, a core in magnetic flux communicating contact with the other polar portions of said magnets, said core being interposed between said pole plates, and spaced therefrom to provide an air gap, a current-carrying coil swingable in said air gap around said core responsive to variations in current in said coil, and magnetic flux conducting wall means united with an edge portion of one said pole plate and extending transversely therefrom into contact with the other said pole plate around at least a portion of said air gap, and spaced from the outer periphery of said core, said wall means having portions adjustably independently movable towards and from said core adjacent the path of swing of said coil, to thereby adjustably vary the magnetic field concentration in said air gap.

4. A meter of the character described comprising a pair of spaced magnets, each having opposed north and south poles, a pair of spaced pole plates in magnetic flux communicating contact with like polar portions of both magnets, a core in magnetic flux communicating contact with the other polar portions of said magnets, said core being interposed between said pole plates, and spaced therefrom to provide an air gap, a current-carrying coil swingable in said air gap around said core responsive to variations in current in said coil, and magnetic flux conducting wall means integral with an edge portion of one said pole plates and extending transversely therefrom into contact with the other said pole plate around at least a portion of said air gap, and spaced from the outer periphery of said core, said wall means having a plurality of circumferentially spaced apertures, a plug member of magnetic material having a screw threaded engagement in each aperture whereby said plug member is adjustably advanceable and retractable in its said aperture towards and away from the path of swing of said coil to thereby adjustably vary the magnetic field concentration in said air gap.

ROBERT D. HICKOK.

REFERENCES CITED

The following references are of record in the file of this patent:

UNITED STATES PATENTS

| Number | Name | Date |
|---|---|---|
| 591,241 | Shallenberger | Oct. 5, 1897 |
| 796,061 | Duncan | Aug. 1, 1905 |
| 1,165,745 | Benecke | Dec. 28, 1915 |
| 1,125,711 | Record | Jan. 19, 1915 |
| 2,183,685 | Lingg | Dec. 19, 1939 |
| 2,183,934 | Heiland | Dec. 19, 1939 |
| 2,318,359 | Bellows | May 4, 1943 |

FOREIGN PATENTS

| Number | Country | Date |
|---|---|---|
| 742,804 | France | Mar. 17, 1933 |
| 486,695 | Great Britain | June 9, 1938 |